United States Patent [19]

Engding

[11] Patent Number: 4,501,716
[45] Date of Patent: Feb. 26, 1985

[54] APPARATUS FOR INSPECTING THE INTERIOR OF A REACTOR VESSEL

[75] Inventor: Alf Engding, Åkersberga, Sweden

[73] Assignee: Tekniska Rontgencentralen AB, Stockholm, Sweden

[21] Appl. No.: 376,998

[22] Filed: May 11, 1982

[30] Foreign Application Priority Data

Sep. 29, 1981 [SE] Sweden ................ 8105755

[51] Int. Cl.³ ............................................. G21C 17/00
[52] U.S. Cl. ................................................... 376/249
[58] Field of Search .................. 376/249; 244/115, 161

[56] References Cited

U.S. PATENT DOCUMENTS

| 3,699,436 | 10/1972 | Shigematsu et al. | 376/249 |
| 3,801,050 | 4/1974 | Stone | 244/115 |
| 3,901,073 | 8/1975 | Dent et al. | 376/249 |
| 3,943,756 | 3/1976 | Aubert et al. | 376/249 |
| 4,083,520 | 4/1978 | Rupp et al. | 244/161 |
| 4,165,254 | 8/1979 | Reyes | 376/249 |
| 4,169,758 | 10/1979 | Blackstone et al. | 376/249 |

Primary Examiner—Sal Cangialosi
Attorney, Agent, or Firm—Sughrue, Mion, Zinn, Macpeak and Seas

[57] ABSTRACT

An arrangement for inspecting a reactor vessel immersed in a water-filled tank (31) comprises a mast carriage which is arranged for movement around the opening of a reactor vessel and which has fixedly connected thereto a mast which carries a track means (10) on which inspection apparatus (19) can be driven. To render it unnecessary to lift the mast carriage and mast into the reactor hall when, for example, replacing inspection apparatus, there is arranged, in accordance with the invention, on the upper end (20) of the mast a docking unit (21) which is provided with a second track means (22) connecting with the first track means (10). A carriage supporting the inspection apparatus can be driven onto the second track means. Guide means (36, 37, 38, 40) are arranged between the docking unit and the mast, and guide ropes (47, 48) for guiding the docking unit, which is provided with a buoyant body, up to the surface of the tank (30) and to guide and pull the docking unit back to its working position on the mast top.

8 Claims, 6 Drawing Figures

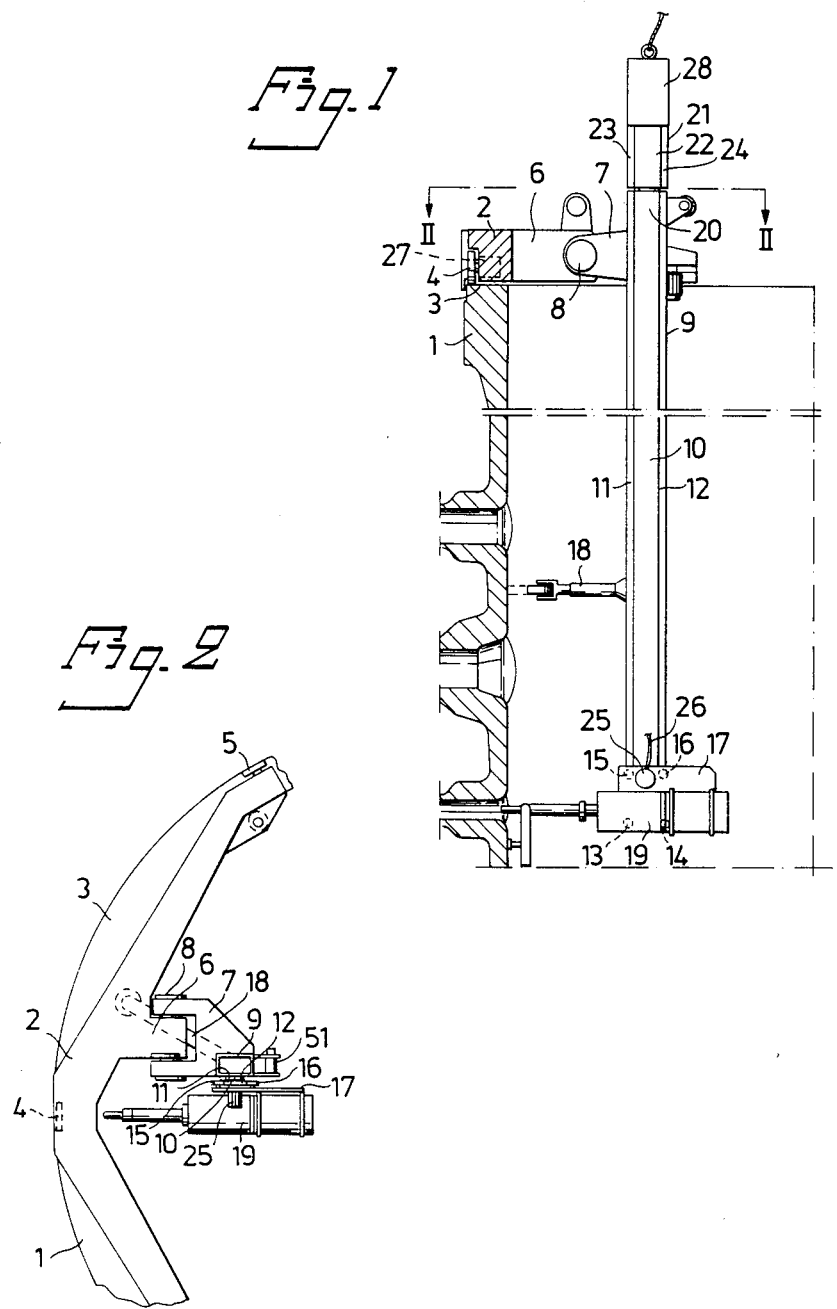

APPARATUS FOR INSPECTING THE INTERIOR OF A REACTOR VESSEL

BACKGROUND OF THE INVENTION

The invention relates to an arrangement for inspecting a reactor vessel immersed in a water-filled tank, the arrangement comprising a driven mast-carriage which is arranged for movement around the upper opening of the reactor vessel and which has fixedly connected thereto a mast having extending therealong first track means for an inspection carriage arranged to carry inspection apparatus and provided with drive means for driving said inspection carriage along said track means.

When changing the inspection apparatus, which may comprise, for example, cameras, ultrasonic devices and like devices, it is necessary to lift the mast and mastcarriage from the tank and place them on the floor of the reactor hall. This is both troublesome and time consuming.

SUMMARY OF THE INVENTION

Consequently a prime object of the invention is to provide an arrangement with which substantially only the inspection carriage, together with the inspection apparatus, is lifted into the reactor hall, whereafter the inspection apparatus is changed and the inspection carriage and said apparatus returned to the mast.

BRIEF DESCRIPTION OF THE DRAWINGS

This object is realised by means of the arrangement hereinafter described with reference to the accompanying drawings, in which:

FIG. 1 is a simplified view of a mast-carriage together with mast; an inspection carriage provided with inspection apparatus and arranged for movement in the axial direction of the mast; and a docking unit; all in accordance with the invention, FIG. 2 is a view taken on the line II—II in FIG. 1.

DETAILED DESCRIPTION OF THE PREFERRED EMBODIMENTS

Figure 3:
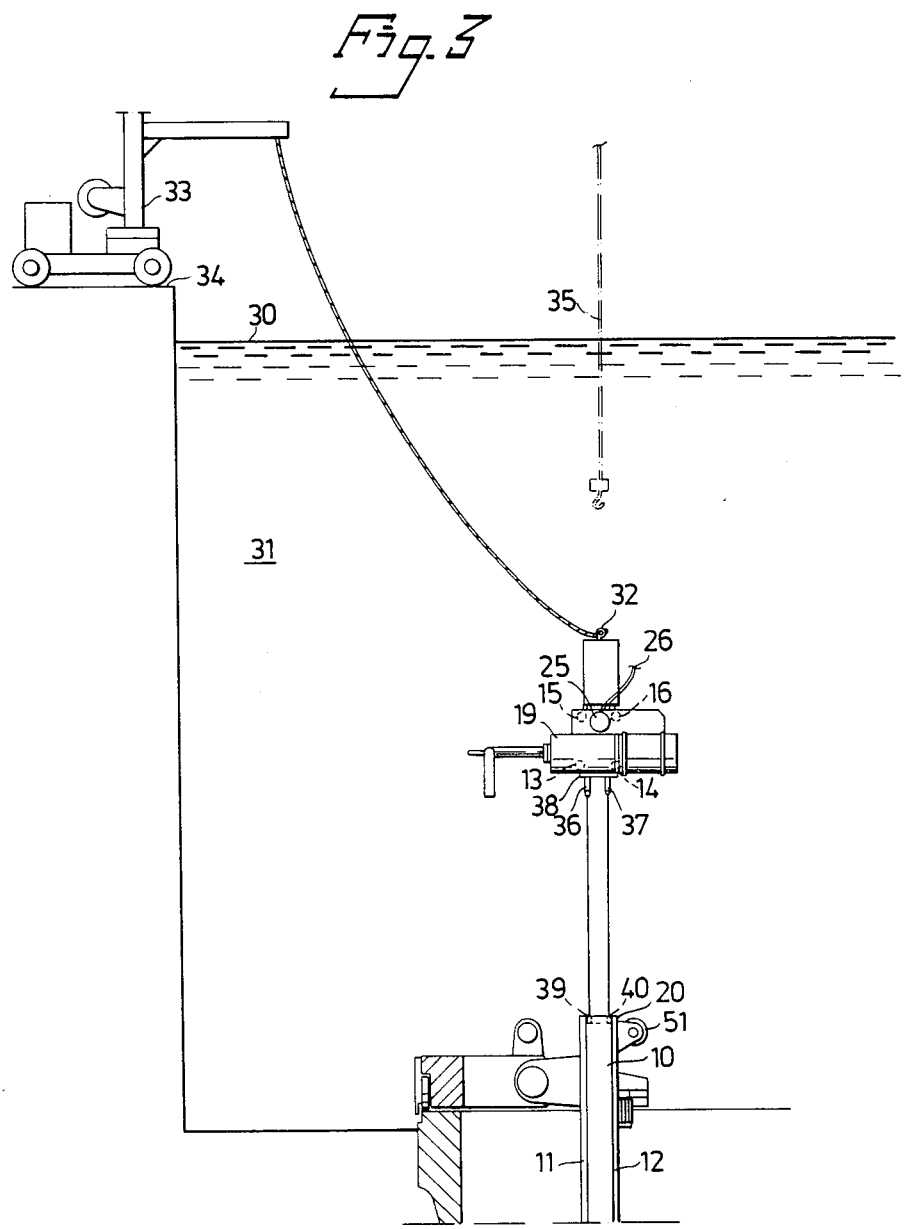
FIG. 3 is a simplified view of the docking unit released from the mast and shows the docking unit during movement thereof to the surface of the reactor tank.

The drawings illustrate part of a reactor vessel 1, having an upper flange on which a mast-carriage 2 is mounted. In the illustrated embodiment, the mast-carriage 2 has the form of a narrow, elongate carrier whose end portions and central portion are provided with runners which abut the upper, circular and planar surface 3 of the reactor vessel. Of the runners only runners 4 and 5 are shown. The carriage 2 is provided with a bracket structure 6 arranged to co-act with a fork 7 pivotally mounted on a shaft 8. The fork 7 carries a mast 9, which in the illustrated embodiment has the form of a box beam of rectangular cross-section. Arranged on one side of the mast is a track means 10 comprising two mutually parallel tracks 11, 12 extending along the substantially vertical mast 9. The tracks 11, 12 are arranged to coact with wheels 13, 14, 15, 16 on a inspection carriage 17. The inspection carriage 17 carries inspection apparatus 19. A support leg 18 having a roller which abuts the inner wall of the reactor tank is provided to maintain the mast in a vertical position, i.e. a position in which the mast is parallel with the centre vertical axis of the cylindrical reactor tank.

The upper end 20 of the mast 9 carries a docking unit 21, which is provided on one side thereof with a second track means 22, the two tracks 23 and 24 of which correspond to tracks 11 and 12. The tracks 11 and 12 extend right to the upper end of the mast 9 and thus merge directly with the tracks 23 and 24, and the inspection carriage 17 can therefore be moved from the track means 10 to the track means 22, the length of the track means 22 being such as to enable the whole of the inspection carriage to be driven onto the docking unit 21. The inspection carriage 17 has a reversible drive motor 25 arranged, for example, to drive one or more of the wheels 13-16, and voltage is supplied to the motor, which in the illustrated embodiment is an electric motor, over a cable 26 which extends up to the reactor hall. The mast-carriage 2 is provided with an electric motor 27, supplied with voltage from a cable (not shown) which also extends up to the reactor hall. In the FIG. 1 embodiment, the docking unit 21 is provided with a buoyant body 28 having the form of a liquid-tight tank filled with air or some other suitably light medium, for example foamed plastics and having a volume which is sufficiently great to lift the docking unit and the inspection carriage 17 with inspection apparatus 19 up to the surface 30 of the water in the tank 31 when the docking unit is released from the mast (FIG. 3). The docking unit is provided with a lifting eye 32 connected to a steel-wire rope or the like, which in turn is coupled to a readily driveable crane 33 on the floor 34 of the reactor hall. Consequently it is not necessary to utilize the overhead crane in the reactor hall, said crane being indicated at 35, and the crane can therefore be used for other purposes, such as to change fuel elements when there is used a mast-carriage of the type described, which leaves at least half the opening of the reactor vessel free.

Figure 4:
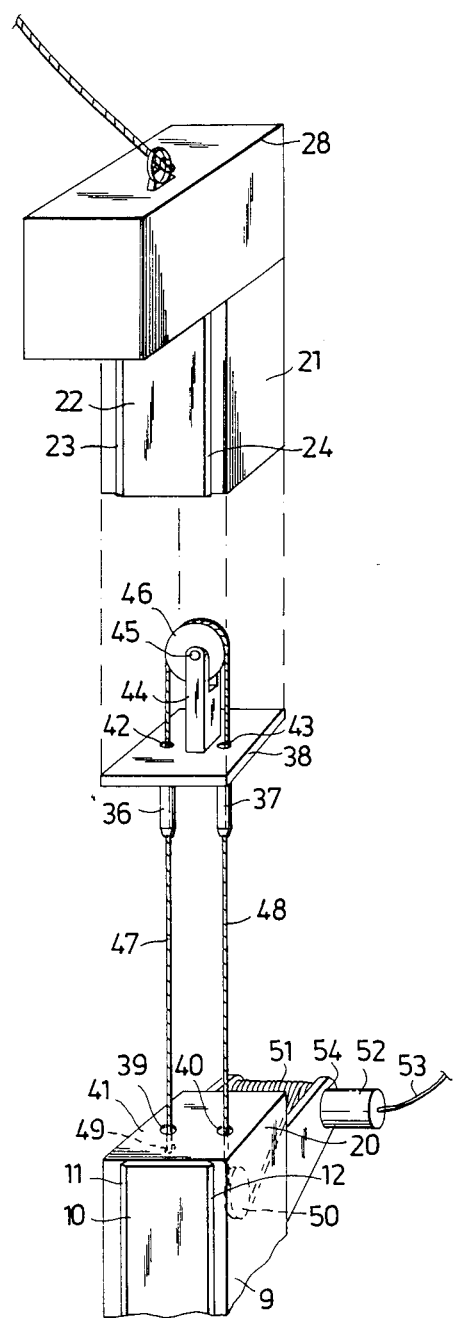
FIG. 4 illustrates the docking unit and the top of the mast in more detail.

FIG. 4 shows the docking unit 21, with the bottom plate 38 thereof being displaced downwardly for the sake of clarity. In the illustrated position, the docking unit 21 is released from the mast 9. The docking unit 21 is also shown released from the mast in FIG. 3. The docking unit is provided with two guide pegs 36 and 37 which are fixedly mounted on the bottom plate 38 and which, in the stationery position of the docking unit illustrated in FIG. 1, extend into corresponding holes 39 and 40 in a plate 41 on the top of the mast. The two mutually co-acting surfaces of the plates 38 and 41 preferably lie at right angles to the longitudinal axis of the mast 9. The purpose of the guide pegs 36, 37 and the holes 39, 40 is to ensure that when in position on the mast top the docking unit is always orientated so that the two track means 22 and 10 are always correctly positioned in register with one another, so that the inspection carriage 17 can be driven from the track means 10 of the mast 9 to the track means 22 of the docking unit 21, and vice versa.

As will be seen from FIG. 4, each of the two guide pegs 36, 37 is through-passed by a respective channel 42 and 43. Fixedly mounted on the inner surface of the bottom plate 38 between the channels 42 and 43 is a bearing block 44 provided with a shaft 45 which extends at right angles to an imaginary line between the centre points of the channels 42 and 43, which are preferably of cylindrical configuration. Mounted for free rotation on the shaft 45 is a pulley 46. Two rope parts 47 and 48 extend over the pulley 46, through the channels 42 and 43 and through the holes 39 and 40. The second, 48, of these rope parts extends over a directing pulley 50, which is rotatably arranged within the mast 9, and passes from the direction pulley 50 to a winch 51 which is arranged externally of the mast and which is driven by means of a reversible electric motor 52, to which voltage is supplied through a cable 53 extending to a voltage source (not shown) in the reactor hall.

In the position illustrated in FIG. 1, it is assumed that the rope parts 47 and 48 are tensioned so that the docking unit is constantly held fast to the mast top, and the guide pegs 36, 37 rest in holes 39,40, which are the same distance apart as the guide pegs and have the same diameter.

When the inspection apparatus 19 on the mast 9 is to be replaced with another inspection apparatus, or is to be repaired or moved to the reactor hall for some other reason with the carriage and the mast in a working position, the motor 25 is started-up and the carriage 17 together with the inspection apparatus is driven up on the track means 22. Voltage is then supplied to the winch motor 52 through the cable 53, and the winch 51 commences to feed out rope, for example a steel-wire rope, a chain, a synthetic-fibre rope or some other means suitable for the purpose, here generally designated rope, whereupon the docking unit 21 begins to rise through the water in the tank. The lifting force is provided by the buoyant body 28 and, optionally, an auxiliary lifting force can be obtained by means of the crane 33 (FIG. 3). When the docking unit 21 together with inspection apparatus 19 has reached the surface 30 of the water, the unit is lifted onto the floor 34 of the reactor hall by means of the crane 33.

When the docking unit 21, together with the inspection apparatus, is to be returned to the mast 9, the docking unit is lowered down into the tank 31 and the motor 52 again started, to drive the winch 51 in a direction such that the line part 48 is wound onto the winch drum. The equally tensioned line parts 47, 48 will guide the guide pegs 36 and 37 into the holes 39, 40, and when the docking unit has been moved into abutment with the mast top, the current to the winch motor 52 is stopped. In order to prevent the winch 51 from rotating when the motor has stopped, there is suitably arranged an irreversible clutch 54 between the winch 51 and the motor 52. This clutch, which may be any conventional irreversible-type clutch, thus forms a latching means which ensures that the line parts are held taut, and thus also that the docking unit is constantly held in its position on the mast top. As will be understood, it is also possible to use separate latching means, arranged, for example, to act between the plates 38 and 41 and to directly lock the docking unit securely to the mast top. It is also assumed that the inspection-carriage motor is provided with a similar clutch, so that said carriage is held firmly in position when the drive motor is stopped, although other kinds of locking means may be provided, acting, for example, between the track means 10 and 22 respectively and the carriage 17. Such latching means may, for example, be electromagnetically controlled, and operated from the reactor hall.

Figure 5:
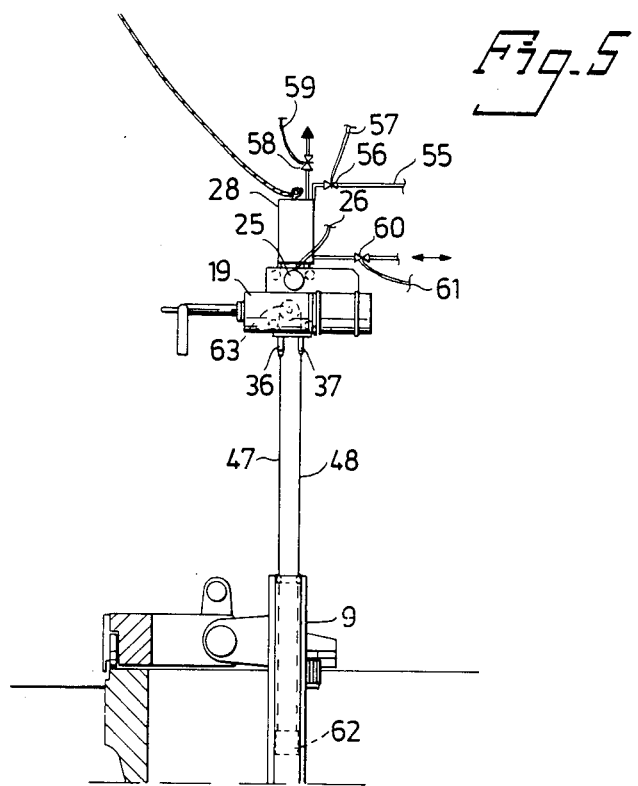
FIG. 5 is a simplified view of a modified docking unit.

FIG. 5 illustrates schematically another embodiment of the docking unit. The only difference between the FIG. 5 embodiment and the aforedescribed embodiment resides in the construction of the bouyant body.

Similar to the aforedescribed, the buoyant body used has the form of a tank 28. Connected to the tank 28 is a compressed-air hose 55 coupled to a compressed-air source (not shown) in the reactor hall. Coupled between the hose 55 and tank 28 is an electromagnetically operated valve 56, which can be set between an open and a closed position by supplying voltage over a cable 57, which extends up to the reactor hall. The tank 28 is also provided with an electromagnetically operable venting valve 58 connected to the upper part of the tank. The electromagnetic operating means (not shown) for the valve 58 is connected to a voltage source (not shown) in the reactor hall by means of a cable 59. There is also provided an electromagnetically operated valve 60 to which an operating voltage is supplied through a cable 61, which also extends up to the reactor hall. Thus, the lifting force exerted by the buoyant body can vary between a lowest value, zero value, at which the valves 60 and 58 have been opened so as to fill the interior of the tank with water from the reactor vessel, and a highest value at which the valves 56 and 60 have been opened so that compressed air is pressed into the tank, causing the water present in said tank to be forced out. The advantage with this buoyant body is that the lifting force can be adapted to the apparatus transported thereby, so that, for example, when lowering the apparatus onto the mast top, the load on the rope can be kept very low and, for example, determined completely by a relatively light counterweight 62 to which the ends of the rope parts are connected and the two rope parts, formed by a continuous rope, extend, in this case, over a free rope pulley 63 in the docking unit and through the guide pegs 36 and 37 and corresponding holes in the mast top, as previously described. The sole purpose of the rope pulley 63 is to hold the two rope parts under the same tension, so that the guide pegs are correctly aligned. If the rope is made from a non-stretchable or substantially non-stretchable material, for example thin chain material, there can be used two mutually independent ropes of equal length, the upper end portions of which are fixedly connected to the downwardly extending ends of the guide pegs. Since in this case the rope parts are not wound onto a winch, but that the counterweight 62 falls downwardly through the free interior of the mast, the total length of each rope must be less than the length of the mast.

Figure 6:
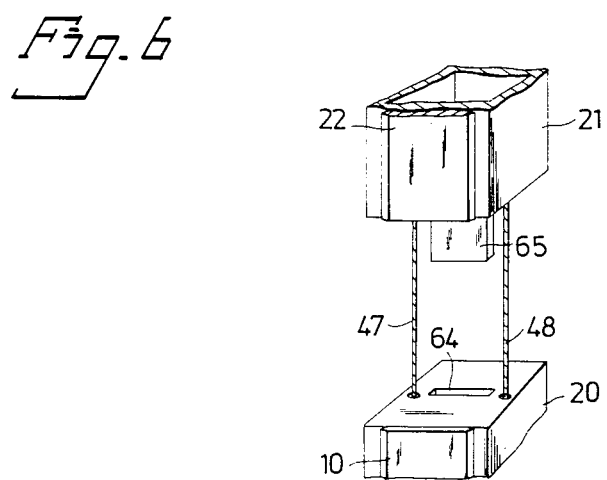
FIG. 6 illustrates modified guide means between the docking unit and the top of said mast.

In the aforegoing it has been assumed that two guide pegs on the docking unit co-act with corresponding guide holes on the mast top, although it will be understood that a greater number of guide pegs and holes, for example three in number, can be used if so desired, and similarly that the number of guide ropes or rope parts can also be increased. It is also possible to use other guide means than the kind illustrated and described, and FIG. 6 illustrates a modified guide means in simplified form. In this embodiment, the mast top 20 is provided with an elongate slot 64 for receiving a tongue 65 on the bottom surface of the docking unit 21, the tongue 65 having the same length and width as the slot 64 so as to provide a good fit. As previously described with reference to the guide pegs, the rope parts 47 and 48 guide the tongue 65 into the slot 64, so that the docking unit 21 will be correctly positioned on the mast top and the track means 22 and 10 in register with one another.

The aforedescribed arrangements can be modified without departing from the scope of the invention. Thus, for example, the winch 51 shown in FIG. 4 can be mounted on the docking unit and the pulley 46 mounted on the mast. The guide pegs 36, 37 or the tongue 65 can be mounted on the mast top and the guide holes 39, 40 or slot 65 co-acting with said pegs or tongue can be arranged in the bottom of the docking unit 21.

Suitably, the rope parts are detachably arranged on the docking unit by, for example, detachably connecting the bottom plate 38 with associated bearing block 44 and directing pulley 46 on the main body of the docking unit, thereby enabling the docking unit to be readily transported away from the reactor hall. When a counterweight according to FIG. 5 is used and the depth of water in the reactor vessel exceeds the length of the mast, the ropes must pass over direction pulleys. The two free ends of the rope are fastened, for example, to the upper part of the mast and each rope part passes over a direction pulley on the counterweight, and over a direction pulley on the docking unit.

I claim:

1. An apparatus for inspecting a reactor vessel immersed in a water-filled tank (31), comprising a mast-carriage (2) arranged for movement around an upper opening of the reactor vessel, a mast (9) fixedly connected to the mast-carriage and having first track means (10) extending therealong for an inspection carriage (17) arranged to carry inspection apparatus (19) and provided with drive means (25) for driving said inspection carriage on said first track means, characterized by: a docking unit (21) detachably mounted on an upper end (20) of the mast; second track means (22) on the docking unit connecting with the first track means and having a length such that the inspection carriage can be driven onto the second track means; guide means (36, 37, 39, 40; 64, 65) arranged between the docking unit and the mast for holding the docking unit in a given position relative to the mast; at least two mutually spaced rope means (47, 48) for connecting the docking unit to the mast; a buoyant body (28) arranged on the docking unit for moving the docking unit to the surface (31) of the water in said tank, and means (46, 51; 62, 63) for enabling, during movement of the docking unit to the surface of the water in said tank, an extension of the rope means lying between the docking unit and the mast top, and for generating a tension force by shortening said rope means to cause the docking unit to be returned to the upper end of the mast, wherein the buoyant body comprises a liquid-tight vessel containing a buoyant medium.

2. An apparatus according to claim 1, wherein the liquid-tight vessel comprises a tank provided with means (55, 56, 57, 58, 59, 60) through which air or water can be introduced into or discharged from the interior of said tank.

3. An apparatus according to claim 1, wherein said guide means comprises at least two mutually parallel, straight guide pegs (36, 37) arranged on the upper end of the docking unit (21) or the mast, said guide pegs being arranged to project into corresponding holes (39, 40) on the mast or on the docking unit respectively when said docking unit occupies its working position on said mast.

4. An apparatus according to claim 1, wherein said guide means comprises at least one guide tongue (65) located on the docking unit or on the mast and arranged to extend into a corresponding, elongate slot (64) on the mast or on the docking unit respectively, when the docking unit occupies its working position on the mast.

5. An apparatus according to claim 1, wherein said means for extending or shortening said rope means comprises a winch (51) driven by a reversible motor (52).

6. An apparatus according to claim 5, wherein locking means (47, 48, 51, 54) are provided for locking the docking unit (21) in its working position on the mast (9).

7. An apparatus according to claim 6, wherein the locking means comprises the rope means (47, 48) and the winch (41).

8. An apparatus according to claim 1 characterized by a counterweight (62) slideable in the mast and arranged to provide said tension force.

* * * * *